(12) United States Patent
Dhawan et al.

(10) Patent No.: US 9,942,348 B2
(45) Date of Patent: Apr. 10, 2018

(54) VERIFYING CONTROLLER ACTIONS IN SOFTWARE-DEFINED NETWORKS WITH CONTROLLER CLUSTERS

(71) Applicant: International Business Machines Corporation, Armonk, NY (US)

(72) Inventors: Mohan Dhawan, New Delhi (IN); Kshiteej Sharad Mahajan, Aurangabad (IN); Vijay Mann, Bangalore (IN); Rishabh Poddar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 14/821,089

(22) Filed: Aug. 7, 2015

(65) Prior Publication Data
US 2017/0041427 A1 Feb. 9, 2017

(51) Int. Cl.
*G06F 15/167* (2006.01)
*H04L 29/08* (2006.01)
*H04L 12/24* (2006.01)
*H04L 12/701* (2013.01)

(52) U.S. Cl.
CPC ...... *H04L 67/2852* (2013.01); *H04L 41/0631* (2013.01); *H04L 41/0695* (2013.01); *H04L 45/00* (2013.01); *H04L 67/1095* (2013.01)

(58) Field of Classification Search
None
See application file for complete search history.

(56) References Cited

U.S. PATENT DOCUMENTS

| | | | |
|---|---|---|---|
| 9,007,922 B1 | 4/2015 | Mittal et al. | |
| 2001/0027537 A1* | 10/2001 | Nada | B60K 6/365 714/23 |
| 2007/0055913 A1* | 3/2007 | Atkins | H04L 43/0811 714/44 |
| 2010/0199042 A1* | 8/2010 | Bates | H04L 67/1095 711/114 |
| 2014/0241356 A1 | 8/2014 | Zhang et al. | |

(Continued)

OTHER PUBLICATIONS

Matsumoto, Stephanos, et al., "Fleet: Defending SDNs from Malicious Administrators", HotSDN '14, Chicago, IL, USA, Aug. 22, 2014, 6 pages, ACM Digital Library.

(Continued)

*Primary Examiner* — Joshua Joo
(74) *Attorney, Agent, or Firm* — Ference & Associates LLC

(57) ABSTRACT

Methods and arrangements for verifying controller actions in a clustered software defined network. A contemplated method includes: intercepting at least one message at the primary controller; wherein the at least one intercepted message comprises a message that induces one or more changes in the network; intercepting at least one cache update in the network; replicating the at least one intercepted message and the at least one cache update; directing the at least one replicated message and the at least one replicated cache update to a verification subsystem; and verifying the at least one replicated message and the at least one replicated cache update in the verification subsystem. Other variants and embodiments are broadly contemplated herein.

18 Claims, 6 Drawing Sheets

(56) References Cited

U.S. PATENT DOCUMENTS

| | | | | |
|---|---|---|---|---|
| 2015/0178492 A1* | 6/2015 | Allen | ................... | G06F 21/44 |
| | | | | 726/29 |
| 2015/0281276 A1* | 10/2015 | U | ......................... | H04L 63/20 |
| | | | | 726/1 |
| 2016/0294688 A1* | 10/2016 | Pacella | ................ | H04L 45/66 |

OTHER PUBLICATIONS

Ball, Thomas, et al., "VeriCon: Towards Verifying Controller Programs in Software-Defined Networks", PLDI '14, Edinburgh, United Kingdom, Jun. 9-11, 2014, 12 pages, ACM Digital Library.

Guha, Arjun, et al., "Machine-Verified Network Controllers", PLDI '13, Seattle, WA, USA, Jun. 16-19, 2013, 12 pages, ACM Digital Library.

Dhawan, Mohan, et al., "SPHINX: Detecting Security Attacks in Software-Defined Networks", NDSS '15, San Diego, CA, USA, Feb. 8-11, 2015, 15 pages, 2015 Internet Society.

\* cited by examiner

```
VERIFIER(S, k)
Input: S : Stream of incoming controller responses.
Input: k : Number of secondary controllers.
Output: O_ρ : Verification result for each individual controller response ρ.
Initialize:
foreach ρ ∈ S do
    O_ρ := Allow
    /*Get cache name from response*/
    cache := GET_CACHE_NAME(ρ)
    /*Get key from response*/
    key := GET_KEY(ρ)
    /*If uninitialized, set Σ_cache,key := 0 for storing
    responses.*/
    τ_cache,key := Σ_cache,key ∪ ρ
    /*Store response in the set*/
    /*Count other matching responses in set*/
    count := COUNT_MATCHING_RESPONSES(ρ, Σ_cache,key)
    if (k + 1 < count) then
        /*External trigger to the primary*/
        /*There is majority*/
        O_ρ := O_ρ ∪ MAJORITY_DECISION(ρ, Σ_cache,key)
            ∪ IS_ACTION_ALLOWED_BY_POLICY_MANAGER(ρ)
    else if (⌊(k+1)/2⌋ ≤ count && k + 1 ≥ count) then
        /*Internal/External trigger to the primary*/
        /*Any other tainted responses in the set?*/
        if (TRUE == IS_MATCH_TAINTED_IN_SET(ρ, Σ_cache,key)) then
            /*External trigger to the primary*/
            Wait for more responses
        else
            /*Internal trigger by the primary*/
            /*There is majority*/
            O_ρ := O_ρ ∪ MAJORITY_DECISION(ρ, Σ_cache,key)
                ∪ IS_ACTION_ALLOWED_BY_POLICY_MANAGER(ρ)
    else
        Wait for more responses
    if (FALSE == O_ρ) then
        /*Raise alarm*/
end
```

FIG. 2

| Feature | Description |
|---|---|
| Controller | ControllerID \| * |
| Trigger | Internal \| External \| * |
| Cache | ArpDB \| HostDB \| EdgeDB \| FlowsDB \| etc. |
| Destination | Local \| Remote \| * |

```
<Policy allow="No">
<Controller id="*"/>
<Action type="Internal"/>
<Cache name="EdgesDB" entry="*,*" operation="*,*"/>
<Destination value="*"/>
</Policy>
```
417

FIG. 4

VERIFYING CONTROLLER ACTIONS IN SOFTWARE-DEFINED NETWORKS WITH CONTROLLER CLUSTERS

BACKGROUND

Generally, it is recognized that controllers for SDNs (Software-Defined Networks) are vulnerable to faults. Normally, such controllers are only logically centralized, while associated distributed entities are then provisioned to provide scalability and fault tolerance. However, several problems associated with decentralization can result in a greater likelihood of faults, and conventional solutions have not been adequate to address such issues.

BRIEF SUMMARY

In summary, one aspect of the invention provides a method of verifying controller actions in a clustered software defined network comprising a primary controller and a plurality of secondary controllers, the method comprising: utilizing at least one processor to execute computer code that performs the steps of: intercepting at least one message at the primary controller; wherein the at least one intercepted message comprises a message that induces one or more changes in the network; intercepting at least one cache update in the network; replicating the at least one intercepted message and the at least one intercepted cache update; directing the at least one replicated message and the at least one replicated cache update to a verification subsystem; and verifying the at least one replicated message and the at least one replicated cache update in the verification subsystem.

Another aspect of the invention provides an apparatus for verifying controller actions in a clustered software defined network comprising a primary controller and a plurality of secondary controllers, the apparatus comprising: at least one processor; and a computer readable storage medium having computer readable program code embodied therewith and executable by the at least one processor, the computer readable program code comprising: computer readable program code that intercepts at least one message at the primary controller; wherein the at least one intercepted message comprises a message that induces one or more changes in the network; computer readable program code that intercepts at least one cache update in the network; computer readable program code that replicates the at least one intercepted message and the at least one intercepted cache update; computer readable program code that directs the at least one replicated message and the at least one replicated cache update to a verification subsystem; and computer readable program code that verifies the at least one replicated message and the at least one replicated cache update in the verification subsystem.

A further aspect of the invention provides a computer program product for verifying controller actions in a clustered software defined network comprising a primary controller and a plurality of secondary controllers, the computer program product comprising: a computer readable storage medium having computer readable program code embodied therewith, the computer readable program code comprising: computer readable program code that intercepts at least one message at the primary controller; wherein the at least one intercepted message comprises a message that induces one or more changes in the network; computer readable program code that intercepts at least one cache update in the network; computer readable program code that replicates the at least one intercepted message and the at least one intercepted cache update; computer readable program code that directs the at least one replicated message and the at least one replicated cache update to a verification subsystem; and computer readable program code that verifies the at least one replicated message and the at least one replicated cache update in the verification subsystem.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION OF THE SEVERAL VIEWS OF THE DRAWINGS

FIG. 2 provides sample code for a workflow for verifying controller actions.

FIG. 3 illustrates the language for a lightweight policy framework.

FIG. 4 illustrates a sample policy.

DETAILED DESCRIPTION

Figure 1:
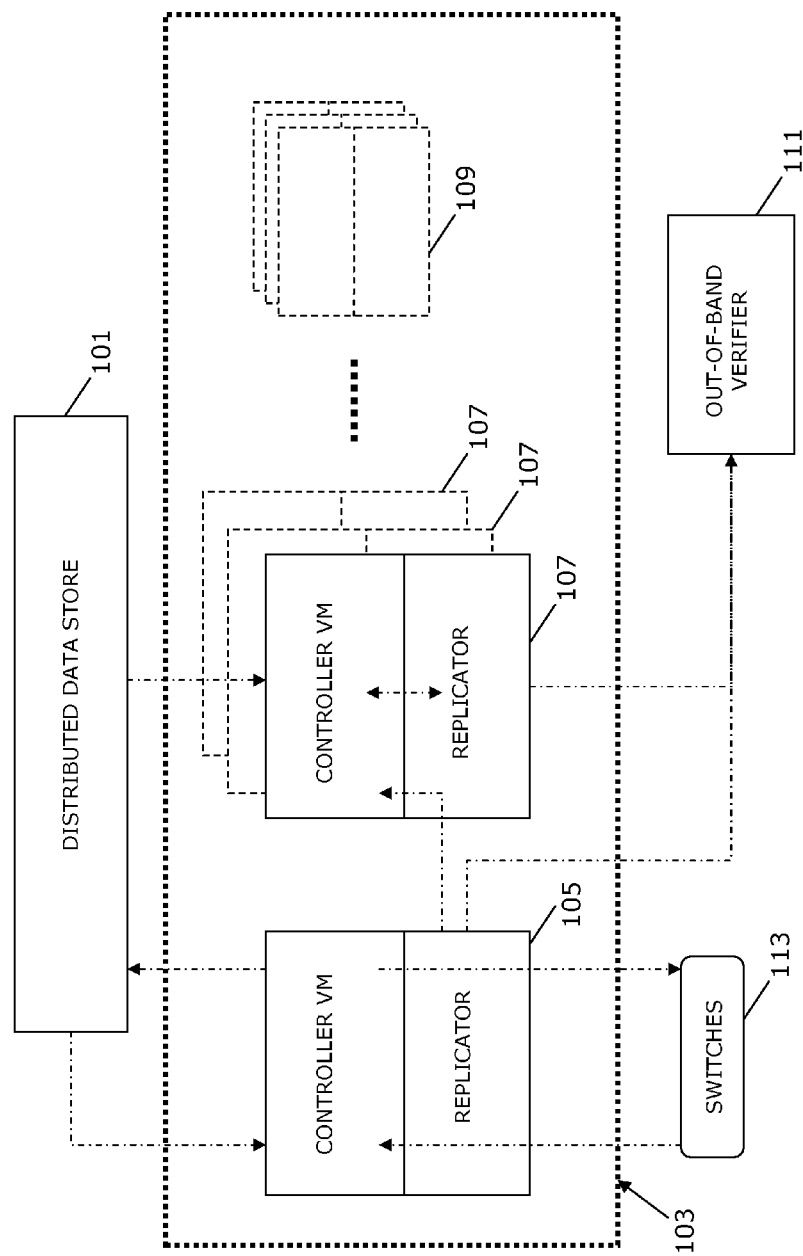
FIG. 1 schematically illustrates a general system architecture.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The description now turns to the figures. The illustrated embodiments of the invention will be best understood by reference to the figures. The following description is intended only by way of example and simply illustrates certain selected exemplary embodiments of the invention as claimed herein.

Specific reference will now be made here below to FIG. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 6. In accordance with an exemplary embodiment, most if not all of the process steps, components and outputs discussed with respect to FIGS. 1-5 can be performed or utilized by way of a processing unit or units and system memory such as those indicated, respectively, at 16' and 28' in FIG. 6, whether on a server computer, a client computer, a node computer in a distributed network, or any combination thereof.

Broadly contemplated herein, in accordance with at least one embodiment of the invention, are methods and arrangements which provide verification of controller actions in a clustered software defined network, via: securely intercepting all messages, i.e., network messages (PACKET_INs, FLOW_MODs) and cache updates to a distributed data store, to and from a suspect controller at a hypervisor to prevent tampering from the suspect controller; securely replicating all intercepted messages within the hypervisor to the verification subsystem; ensuring that the verification subsystem is immune to tampering by the suspect controller; ensuring taint propagation within the verification subsystem to map responses to triggers, thereby enabling easy action attribution; and verifying the suspect controller's responses in the verification subsystem. This can involve the verification subsystem being distributed, which can include randomly selected controller nodes in the cluster and an out-of-band verifier, along with: securely intercepting, tainting and replicating PACKET_INs to the randomly selected controller nodes; ensuring propagation of tainted messages within the secondary controller to issue the exact same response as the primary controller; securely intercepting and replicating cache updates & FLOW_MODs to the out-of-band verifier; and verifying responses via a time-bound majority check.

Moreover, in accordance with at least one embodiment of the invention, there are broadly contemplated herein methods and arrangements where administrator defined policies are specified through a declarative policy language and validated by a policy validator that uses the policies to augment a permissible global network state. Additionally, there can be provided a comprehensive coverage against broad classes of attacks on all network states while leveraging a minimal Trusted Computing Base that does not even trust the network controller. Further, a verification subsystem can reside in an out-of-band network with the untrusted controller cluster.

The features discussed above, and others, relating to at least one embodiment of the invention, will be better appreciated from the discussion which follows.

It should generally be understood, in connection with at least one embodiment as broadly contemplated herein, that for a given trigger, one of the controllers can act as the primary controller and since this is the controller whose actions are being verified this can be referred to as a "suspect controller." The rest of the controllers in the cluster can be referred to as "secondary controllers" and they, along with the out-of-band verifier can constitute a verification subsystem. Note, that for a subsequent trigger, another controller may act as the primary (and hence the "suspect") controller and a different set of secondary controllers (along with out-of-band verifier) will then constitute the verification subsystem.

In accordance with a general background relative to at least one embodiment of the invention, it can be appreciated that prevailing states at distributed controller nodes may be out-of-sync with each other. Conventional tools tend only to verify the configuration status of resources used by the cluster software, while operational differences may still arise due to differing states among the nodes. Incorrect state propagation may result in cascaded network failures, while other faults can arise from active malicious administrators. Thus, there is normally an objective of verifying controller actions, e.g., to determine whether or not an action by an individual controller node in a cluster is valid, or to identify the trigger and the controller that initiated a particular action.

In accordance with a general background relative to at least one embodiment of the invention, the difficulty of verifying controller faults is recognized. In distributed caches, a transparency of actions implies that local actions affect switches directly under control and remote actions affect switches governed by another controller. Further, controllers tend to respond to a variety of triggers. External triggers, that is, any triggers from outside of a controller VM (virtual machine), can potentially derive from an interaction—in one direction—with switches, and a REST (representational state transfer) interaction in another direction. Internal triggers, arising within the controller VM, can derive from administrator specified actions, e.g., delegation of remote FLOW_MODs, or periodic actions specific to a controller application.

In accordance with a context of at least one embodiment of the invention, it is recognized that among the classes of faulty controller activities, three types can be identified. "Type I" includes: controller reactions to external network triggers; and incorrect writes to cache and/or to the network. "Type II" includes: controller reactions to internal triggers; and writes to both cache and network, yet with inconsistency in the resultant entries. "Type III" includes: controller reactions to internal triggers; and no inconsistency in writes to cache or network, yet the entry that is written may itself be faulty or malicious in nature.

In accordance with a general background relative to at least one embodiment of the invention, it is recognized that conventional efforts have involved the provision of controllers in a language amenable to formal analysis. However, this does not easily translate to all commercial SDN deployments, as many controllers tend to be developed "from scratch" as a distinct entity.

FIG. 1 provides a general system architecture, in accordance with at least one embodiment of the invention. As shown, a distributed data store 101 can be in communication with a cluster of controllers 103 that serve as part of a network; the data store 101 serves as cache storage for the controllers and provides message authentication. Included in the controllers are a primary controller 105, including a controller VM and a replicator, and a set of secondary controllers 107 (each also including a controller VM and a replicator). One or more other sets of secondary controllers 109 may also be provided, depending on the cluster 103 at hand. As broadly contemplated herein, all network activity is verified using redundancy; to this end, all controller communication (external and internal) to a primary controller 105 is intercepted, and replicated to randomly selected secondary controllers in the cluster. Here, it can be ensured that secondary controllers elicit the same response as the primary controller 101. Responses are then verified in an out-of-band verifier 111. Switches 113 help connect the cluster 103 with the rest of the network.

Generally, in accordance with a context of at least one embodiment of the invention, enterprise deployments involve a cluster of SDN controllers that are logically centralized (i.e. can be configured and addressed as a single logical unit) for enterprise network management. A cluster of controllers is then used to avert a scenario involving a single point of failure, and also for scalability. There can also still be scenarios in which a fault in one of these SDN controllers (e.g., due to misconfiguration or insider security threats) can cause damage in the enterprise network. An arrangement as broadly contemplated herein will detect and help mitigate operational or security threats associated with a distributed SDN controller deployment. This will operate particularly well if there is a low probability of all controller nodes in a cluster developing a fault (due to misconfiguration or security threat) being low. Also, this can rely on an honest majority of controllers validating each action done by every controller node, e.g., by comparing an action with actions elicited from other controller nodes given the same input.

Several steps are broadly contemplated in accordance with at least one embodiment of the invention. In a first step, all controller communication (external and internal) to the primary controller 101 is intercepted, and then replicated to one or more randomly selected secondary controllers (107) in the cluster. Here, "primary controller" refers to that controller which received a trigger either from an admin or a switch, wherein all other controllers in the cluster act as secondary controllers for this given trigger. This trigger is then intercepted and sent to one or more secondary controllers (107) in the cluster. This is done via a secure proxy at primary controller 101 that replicates all incoming OpenFlow packets or triggers to a random set of one or more secondary controllers 107. The triggers are replicated to the secondary controllers 107 so that they can execute the same logic as the primary controller 101 in response to the given input and generate the correct response; this can be referred to as a "replicated execution".

In accordance with at least one embodiment of the invention, a second step involves ensuring that secondary controllers 107 elicit the same response as the primary controller 101. At each secondary controller 107, there is a need to identify triggers that arrive as a result of replication at the primary controller 101 from triggers that are received directly from network switches 113 or an administrator. This is significant because the actions generated in response to replicated triggers should preferably only be used for validating the response from primary controller 101, and should never be sent to the switches 113. In order to achieve this, the replicated triggers are marked with special identifiers in a header; such identifiers are referred to herein as "taints". Once the replicated triggers are tainted, they are passed onward in the SDN controller pipeline to generate the required response; here, the taint is carried forward in the pipeline and the resulting response also carries the taint.

In accordance with at least one embodiment of the invention, additional steps involve relaying primary and secondary controller responses to the out-of-band verifier (or validator) 111. All the responses thus generated in the aforementioned second step (including, a response from the primary controller 101 and the tainted responses from the secondary controllers 107), along with any distributed object cache updates, are then sent to verifier 111; here, the verifier is out-of-band since it resides on an isolated network and cannot be reached from the network in which the controllers reside.

In accordance with at least one embodiment of the invention, another step provides two ways of validating the responses and cache updates in the out-of-band verifier 111. First, the system undertakes validation via a time-bound majority check of the responses; i.e., it marks identical responses that come from the majority of controllers as a "correct" response, while any deviation therefrom—from any other controller—is marked as "suspicious". Next, the system undertakes validation via online SVM (support vector machine) based classifiers that classify the responses as genuine, or not.

In accordance with at least one embodiment of the invention, a workflow for verifying controller actions, particularly of Type I as discussed heretofore, involves secure interception and replication. Here, there is a differentiation of triggers inasmuch as they impact primary and secondary controllers, respectively. To that end, it is ensured that triggers cannot be tampered with, and triggers are replicated to randomly selected secondary controllers. For external triggers, a custom replicator module in the controller (105 or 107) intercepts all PACKET_IN and REST queries. The replicator taints the triggers and sends it to a given number of other secondary controllers. For internal triggers, inasmuch as these cannot be explicitly intercepted, a cache update event is intercepted. The distributed data store 101 replicates, and authenticates, cache messages (thereby preventing controllers from masquerading as another node). Tampering with a message can be detected inasmuch as there is a majority of nodes detected with correct behavior.

In accordance with at least one embodiment of the invention, a workflow for verifying controller actions of Type II involves action attribution; secondary controllers need to elicit a correct response since controller nodes share all distributed states, and there is a need to identify which action corresponds to which controller. For external triggers, a taint provided by replicator is propagated across the controller concerned as well as in any output actions; the tainted actions are also sent to the out-of-band verifier (111), and are suppressed to prevent inadvertent side-effects on the network state. For internal triggers, the distributed data store 101 provides action attribution using message authentication.

In accordance with at least one embodiment of the invention, a workflow for verifying controller actions of Type III involves response verification, via matching all incoming controller responses to obtain a majority decision. This involves a majority of k+1 or more for a external trigger, (k+1)/2 or more for an internal trigger. Sample code for this procedure (213) is shown in FIG. 2. Other methods for response verification include: comparing against a trusted controller based on past history, a "black box" approach that approximates checks, and an SVM-based ML (maximum likelihood) approach.

In accordance with at least one embodiment of the invention, constraint specification can involve a light-weight policy framework that checks but does not enforce policies. FIG. 3 provides an illustrative example of a policy language for such a framework (315); this also specifies controller IDs for which to check constraints about actions at specified triggers. FIG. 4, for its part, sets for an illustrative example of a policy (417) for preventing all controllers from proactively modifying topological entries in a cache (here, an "EdgesDB" cache).

Figure 5:
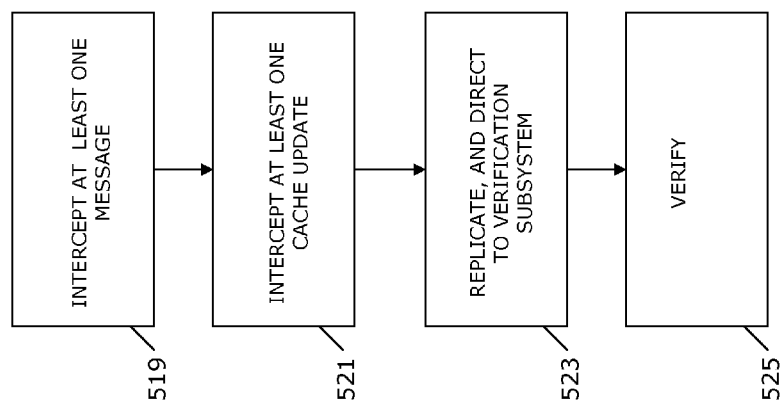
FIG. 5 schematically illustrates a process more generally for verifying controller actions in a clustered software defined network comprising a primary controller and a plurality of secondary controllers.

FIG. 5 schematically illustrates a process more generally for verifying controller actions in a clustered software defined network comprising a primary controller and a plurality of secondary controllers, in accordance with at least one embodiment of the invention. As shown, at least one message at the primary controller is intercepted, wherein the at least one intercepted message comprises a message that induces one or more changes in the network (519). At least one cache update in the network is intercepted (521). The at least one intercepted message and the at least one intercepted cache update are replicated; the at least one replicated message and the at least one replicated cache update are directed to a verification subsystem (523). The at least one replicated message and the at least one replicated cache update are verified in the verification subsystem (525).

It can be appreciated from the foregoing that, in accordance with at least one embodiment of invention, a technical improvement is represented at least via verification of controller actions in a clustered software defined network, via: securely intercepting intercept all messages to and from a suspect controller at a hypervisor to prevent tampering from the suspect controller.

In accordance with at least one embodiment of the invention, very generally, quantitative values as determined herein, or other data or information as used or created herein, can be stored in memory or displayed to a user on a screen, as might fit the needs of one or more users.

Figure 6:
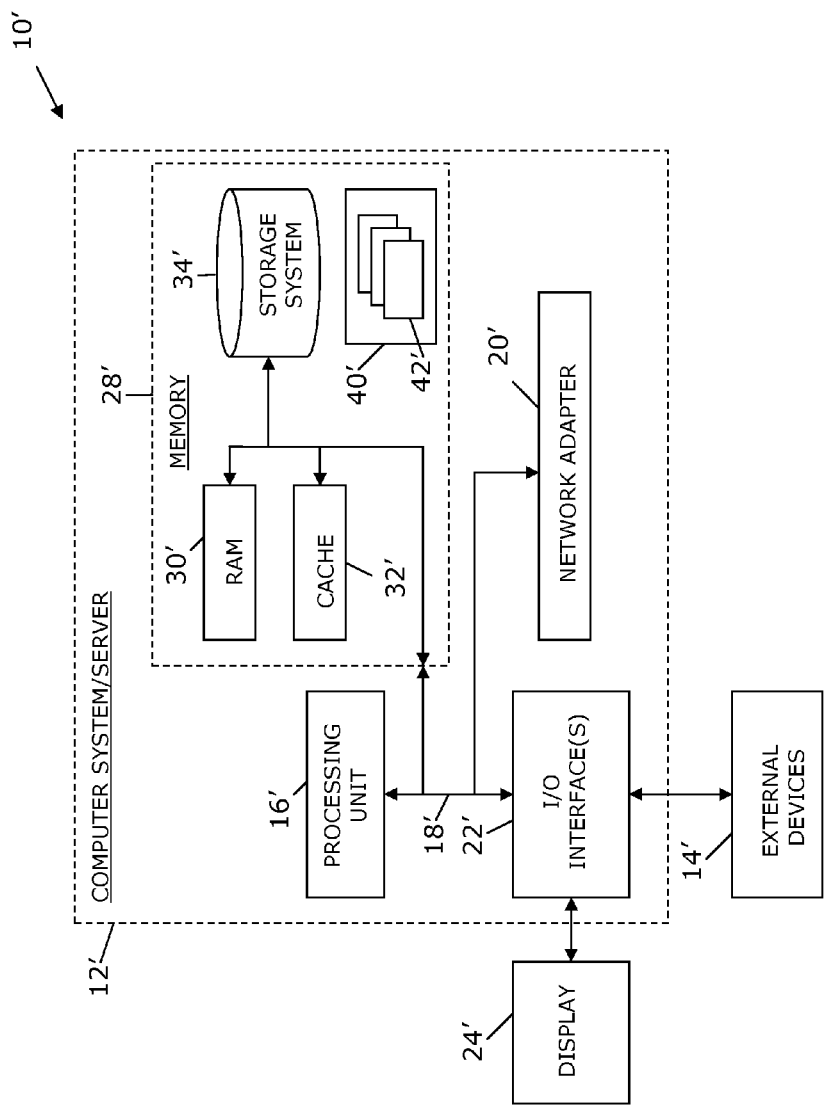
FIG. 6 illustrates a computer system.

Referring now to FIG. 6, a schematic of an example of a computing node is shown. Computing node 10' is only one example of a suitable computing node and is not intended to suggest any limitation as to the scope of use or functionality of embodiments of the invention described herein. Regardless, computing node 10' is capable of being implemented and/or performing any of the functionality set forth hereinabove. In accordance with embodiments of the invention, computing node 10' may be part of a cloud network or could be part of another type of distributed or other network (e.g., it could represent an enterprise server), or could represent a stand-alone node.

In computing node 10' there is a computer system/server 12', which is operational with numerous other general purpose or special purpose computing system environments or configurations. Examples of well-known computing systems, environments, and/or configurations that may be suitable for use with computer system/server 12' include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12' may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12' may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method of verifying controller actions in a clustered software defined network comprising a primary controller and a plurality of secondary controllers, said method comprising:
utilizing one or more processors to execute computer code that performs the steps of:
intercepting at least one message at the primary controller wherein the at least one message is associated with an external trigger comprising a communication event arising from outside the primary controller;
wherein the at least one intercepted message comprises a message that induces one or more changes in the network;
intercepting at least one cache update in the network, wherein the at least one cache update is responsive to an internal trigger comprising a communication event arising within the primary controller;
replicating, to at least one randomly selected secondary controller from the plurality of secondary controllers, the at least one intercepted message and the at least one intercepted cache update;
directing a response to the at least one message from the primary controller, a response to the at least one cache update, a response to the at least one replicated message, and a response to the replicated at least one cache update to a verification subsystem; and
verifying the at least one replicated message and the at least one replicated cache update in the verification subsystem, wherein the verifying comprises comparing the responses from the primary controller with the responses from the at least one randomly selected secondary controller.

2. The method according to claim 1 wherein said verifying comprises verifying that the response of the at least one randomly selected secondary controller matches the response of the primary controller.

3. The method according to claim 2, wherein said verifying comprises propagating one or more tainted messages.

4. The method according to claim 1, wherein the verification subsystem comprises a data store that receives the at least one replicated cache update.

5. The method according to claim 1, wherein the verification subsystem resides on a network separate from the clustered software defined network.

6. The method according to claim 1, comprising:
detecting a trigger at one or more of: the primary controller, and at least one of the secondary controllers; and
propagating at least one taint within the verification subsystem to map one or more responses to the detected trigger.

7. The method according to claim 1, wherein the verification subsystem comprises a subsystem having access to more than one controller.

8. The method according to claim 1, wherein said verifying comprises verifying responses to the at least one message via a majority check of the plurality of secondary controllers.

9. The method according to claim 1, wherein said intercepting said at least one message comprises intercepting at least one message at a hypervisor.

10. A system for verifying controller actions in a clustered software defined network comprising a primary controller and a plurality of secondary controllers, said system comprising:
a plurality of processors; and
one or more computer readable storage medium having computer readable program code embodied therewith and executable by the plurality of processors, the computer readable program code comprising:
computer readable program code that intercepts at least one message at the primary controller, wherein the at least one message is associated with an external trigger comprising a communication event arising from outside the primary controller;
wherein the at least one intercepted message comprises a message that induces one or more changes in the network;
computer readable program code that intercepts at least one cache update in the network, wherein the at least one cache update is responsive to an internal trigger comprising a communication event arising within the primary controller;
computer readable program code that replicates, to at least one randomly selected secondary controller from the plurality of secondary controllers, the at least one intercepted message and the at least one intercepted cache update;
computer readable program code that directs a response to the at least one message from the primary controller, a response to the at least one cache update, a response to the at least one replicated messages and a response to the at least one replicated cache update to a verification subsystem; and
computer readable program code that verifies the at least one replicated message and the at least one replicated cache update in the verification subsystem, wherein the verifying comprises comparing the responses from the primary controller with the responses from the at least one randomly selected secondary controller.

11. A computer program product for verifying controller actions in a clustered software defined network comprising a primary controller and a plurality of secondary controllers, said computer program product comprising:
a computer readable storage medium having computer readable program code embodied therewith, the computer readable program code comprising:
computer readable program code that intercepts at least one message at the primary controller, wherein the at least one message is associated with an external trigger comprising a communication event arising from outside the primary controller;
wherein the at least one intercepted message comprises a message that induces one or more changes in the network;
computer readable program code that intercepts at least one cache update in the network, wherein the at least one cache update is responsive to an internal trigger comprising a communication event arising within the primary controller;
computer readable program code that replicates, to at least one randomly selected secondary controller from the plurality of secondary controllers, the at least one intercepted message and the at least one intercepted cache update;
computer readable program code that directs a response to the at least one message from the primary controller, a response to the at least one cache update, a response to the at least one replicated message, and a response to the at least one replicated cache update to a verification subsystem; and computer readable program code that verifies the at least one replicated message and the at least one replicated cache update in the verification subsystem, wherein the verifying comprises comparing the responses from the primary controller with the responses from the at least one randomly selected secondary controller.

12. The computer program product according to claim 11, wherein the verification subsystem comprises a data store that receives the at least one replicated cache update.

13. The computer program product according to claim 11, wherein the verification subsystem resides on a network separate from the clustered software defined network.

14. The computer program product according to claim 11, comprising:

computer readable program code that detects a trigger at one or more of: the primary controller, and at least one of the secondary controllers; and computer readable program code that propagates at least one taint within the verification subsystem to map one or more responses to the detected trigger.

15. The computer program product according to claim 11, wherein the verification subsystem comprises a subsystem having access to more than one controller.

16. The computer program product according to claim 11, wherein the verifying comprises verifying responses to the at least one message via a majority check of the plurality of secondary controllers.

17. The computer program product according to claim 11, wherein the intercepting said at least one message comprises intercepting at least one message at a hypervisor.

18. A method comprising:

intercepting messages, at a hypervisor, to and from a controller in a clustered software defined network;

the intercepted messages including at least one network update corresponding to an external trigger comprising a communication event arising from outside the controller, and at least one cache update for a distributed data store in communication with the network, wherein the at least one cache update is responsive to an internal trigger comprising a communication event arising within the controller;

replicating all the intercepted messages to a verification subsystem comprising at least one randomly selected secondary controller;

the verification subsystem comprising a distributed subsystem which includes at least one randomly selected controller node in the network and an out-of-band verifier; and utilizing the verification subsystem to verify responses to the messages from a suspect controller by comparing the responses, to the external trigger and the internal triggers, from the controller, with responses, to the replicated intercepted messages, from the at least one randomly selected secondary controller.

* * * * *